United States Patent

[11] 3,600,977

[72] Inventor Nelson H. Bogie
 Rte. 1, Gilbertsville, Ky. 42044
[21] Appl. No. 27,363
[22] Filed Apr. 10, 1970
[45] Patented Aug. 24, 1971

[54] SHAFT-MOUNTED REDUCTION DRIVE MECHANISM
 4 Claims, 3 Drawing Figs.

[52] U.S. Cl. ........................................... 74/801,
 74/421 A, 198/127 E, 254/186 R
[51] Int. Cl. .............................................. F16h 1/28,
 B65g 13/02, B66d 1/12
[50] Field of Search ............................................ 74/801, 421
 A; 254/186; 198/127 E

[56] References Cited
UNITED STATES PATENTS

| 955,201 | 4/1910 | Rand | 74/801 X |
| 1,614,031 | 1/1927 | Holmes | 198/127 EX |
| 2,198,863 | 4/1940 | Corey et al. | 198/127 EX |
| 2,444,364 | 6/1948 | Panish | 74/801 X |
| 2,488,833 | 11/1949 | Sharp et al. | 74/801 X |
| 3,147,764 | 9/1964 | Jensen | 74/801 X |

FOREIGN PATENTS

| 897,353 | 5/1944 | France | 74/421 A |
| 1,201,945 | 6/1959 | France | 74/421 A |
| 858,184 | 12/1952 | Germany | 74/801 |

*Primary Examiner*—Carlton R. Croyle
*Assistant Examiner*—Thomas C. Perry
*Attorney*—Harrington A. Lackey ABSTRACT: A drive mechanism including a frame suspended upon a driven roller shaft, and a two-stage reduction assembly and drive motor mounted on the frame. The first reduction stage comprises a worm wheel and a worm driven by the motor, and the second reduction stage comprises a planetary gear assembly coupled to the worm wheel and the roller shaft.

INVENTOR
NELSON HARVEY BOGIE

3,600,977

SHAFT-MOUNTED REDUCTION DRIVE MECHANISM

BACKGROUND OF THE INVENTION

Conventionally, the shafts of driven rollers, such as those incorporated in conveyor systems, specifically those employed as head rollers for conveyor belts, have been driven by very elaborate driving mechanisms. A typical driving mechanism would include an electrical motor coupled to the driven shaft by reduction pulleys and belts, chains and sprockets, or intermeshing reduction gears. Typically, the drive motor is mounted on the floor of the plant, or on some stationary platform or frame. Regardless of the type of speed reducer assembly employed, a large amount of space is occupied by the reduction elements and the drive motor. In conveyor assemblies where the drive motor must, of necessity, be located at a distance from the head roller, additional space is required for the various reduction elements to transmitting the power from the motor to the head roller.

SUMMARY OF THE INVENTION

It is therefore an object of this invention to provide a compact drive and speed reduction mechanism, which will not only occupy a minimum of space, but which may also be carried by the shaft of the driven roller.

The reduction drive mechanism made in accordance with this invention includes a frame suspended from the shaft to permit free rotation between the shaft and the frame. The frame, in turn, supports the entire speed reduction mechanism and the drive motor.

The speed reduction assembly includes a planetary gear assembly in which the sun gear is freely rotatable about the roller shaft and the ring gear is fixed to the frame. The planetary gears, meshing between the sun gear and the ring gear, are rotatably mounted upon the planetary carrier, which, in turn, is fixed to drive the roller shaft. The sun gear is driven by a drive motor, also mounted upon the frame, preferably through a first reduction stage, such as a worm and worm wheel.

The compactness of the planetary gear reduction stage, as well as the small diameter of the worm, provides a total reduction transmission system which will occupy a minimum of space.

The drive motor coupled to the worm is mounted upon a platform forming a part of the frame, and extending laterally from the axial plane of the shaft, so that the weight of the motor and the length of the platform provide a torque arm which assists in counteracting rotational inertia as the roller accelerates to full speed. A torsion bar is also fixed to the motor platform to stabilize the motor and reduction assembly in a substantially stationary position.

DESCRIPTION OF THE PREFERRED EMBODIMENT

Figure 1:
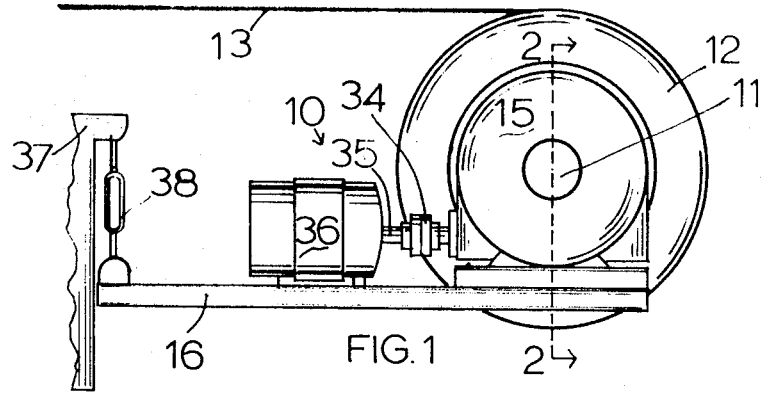
FIG. 1 is a side elevation of the invention mounted upon the shaft of a conveyor head roller.

Referring now to the drawings in more detail, the drive mechanism 10 made in accordance with this invention is disclosed in FIG. 1 as being mounted upon the shaft 11 of a head roller 12 supporting a conveyor belt 13. The frame of the drive mechanism 10 includes a reduction gear housing 15, to the bottom of which is fixed and projects laterally thereof an elongated motor platform 16.

Figure 2:
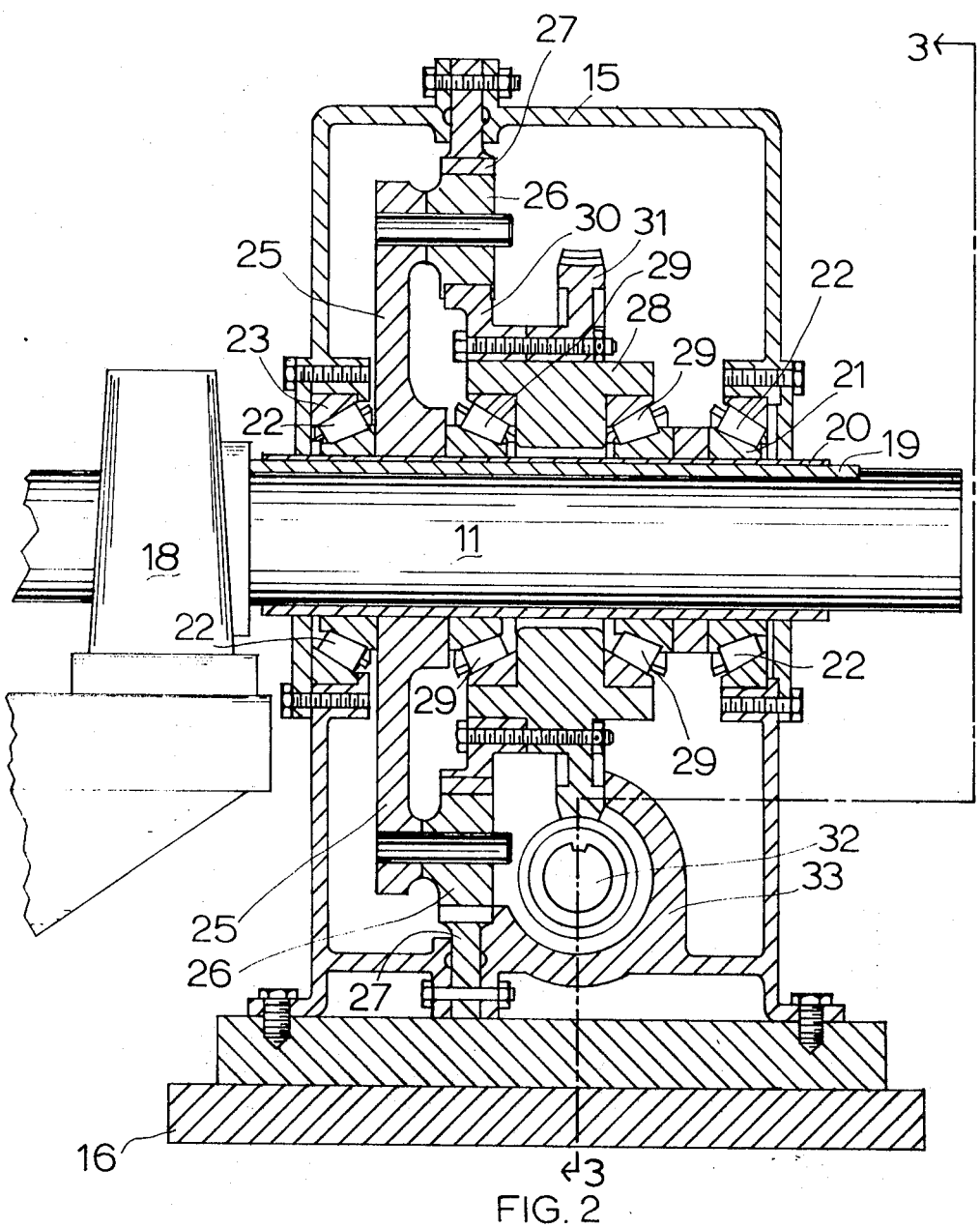
FIG. 2 is an enlarged section taken along the line 2—2 of FIG. 1, with the roller shaft disclosed fragmentarily, and two of the planetary gears being disclosed 180° apart, for clarity.

As best disclosed in FIG. 2, the housing 15 is mounted upon the portion of the roller shaft 11 extending laterally beyond one end of the head roller 12 and on the opposite side of the shaft bearing 18 from the roller 12. Fixed to the planetary sleeve 20 are a pair of longitudinally spaced bearing collars 21 engaging the thrust roller bearings 22, which in turn engage the bearing races 23 at opposite ends of the housing 15. In this manner, the shaft 11 is free to rotate relative to the housing 15 and yet still support the housing 15 and all its contents.

Figure 3:
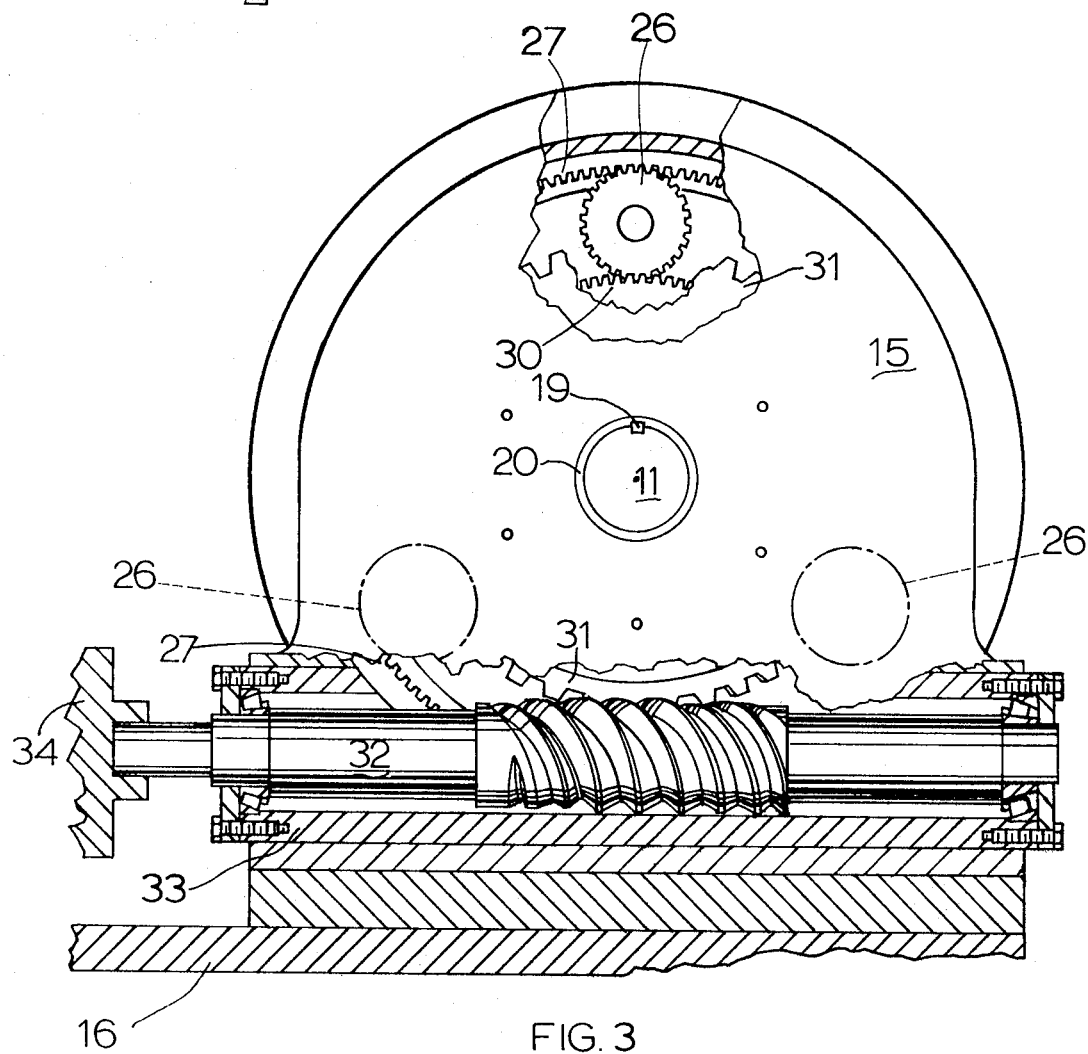
FIG. 3 is a section taken along the line 3—3 of FIG. 2, with portions broken away, and disclosing three planetary gears spaced 120° apart.

Also fixed to the planetary sleeve 20 is the annular planetary carrier 25. As best disclosed in FIG. 3, three planetary gears 26 are rotatably mounted upon the planetary carrier 25 radially equidistant from the center of the shaft 11, and circumferentially equally spaced at 120° intervals. The planetary gears 26 are disclosed in FIG. 2 at 180° intervals, merely for clarity of disclosure.

Fixedly mounted in the cylindrical housing wall 15 is an internal ring gear 27 which meshes with the planetary gears 26.

As best disclosed in FIG. 2, a drive gear body 28 is mounted concentrically about the shaft 11 upon shaft bearings 29, which permit the drive gear body 28 to rotate freely about the shaft 11 and the planetary sleeve 20. Mounted on the periphery of the drive gear body 28 is the sun gear 30 meshed with the planetary gears 26.

Also mounted upon the periphery of the drive gear body 28 and spaced axially from the sun gear 30 is a worm wheel 31. The worm wheel 31 is driven by an elongated worm 32, which in turn is journaled for rotation in the worm housing 33 forming an integral part of the reduction gear housing 15. However, the longitudinal axis of the worm 32 is disposed at right angles to the shaft axis 11, and projects laterally from the gear housing 15, where it is connected by coupling 34 to the drive shaft 35 of motor 36. The motor 36 is fixed to the platform 16, so that the weight of the motor 36 and the platform 16 produce a counterclockwise moment about the shaft 11. Such a moment is effective to counterbalance the torque in either accelerating or decelerating the roller 12, depending upon the direction of rotation of the roller 12. The motor 36 and platform 16, as well as the reduction housing 15, are maintained in a stable, and substantially stationary, position, by connecting the free end of the motor platform 16 to a fixed support 37 by means of a torsion bar 38.

It will thus be seen that the drive mechanism 10 is compact enough to permit its suspension upon the driven shaft 11, because of the mechanisms constituting the first and second reduction stages. Not only do these mechanisms provide two gear reductions, to permit the use of a comparatively small high-speed motor, but the planetary gear assembly and the worm and worm wheel assembly are relatively lightweight and compact, so as to not overburden the strength of the roller shaft 11.

By locating the reduction housing 15 adjacent the shaft bearing 18, a minimum bending moment is exerted upon the extended end of the shaft 11, as best disclosed in FIG. 2.

The drive mechanism 10 may always be of the same compact size, regardless of the location of the head roller 12, and thereby avoid the expensive transmission elements required for the driving of a roller at a remote distance from a fixed motor.

What I claim is:

1. A reduction drive mechanism for a roller comprising:
  a. a roller shaft fixed to a roller and projecting beyond one end of the roller,
  b. shaft bearing means supporting said shaft for rotary movement,
  c. a frame suspended on said shaft to permit rotary movement of said shaft relative to said frame,
  d. a ring gear fixed to said frame concentrically of said shaft,
  e. a planetary carrier fixed to said shaft,
  f. a plurality of planetary gears rotatably mounted on said carrier and meshing with said ring gear,
  g. a sun gear rotatably mounted concentrically on said shaft and meshing with said planetary gears,
  h. a worm wheel fixed to said sun gear for rotatable movement concentrically on said shaft,
  i. a worm meshing with said worm wheel, and j. drive means on said frame for rotating said worm.

2. The invention according to claim 1 in which said frame is provided with bearing means rotatably receiving said shaft.

3. The invention according to claim 1 in which said frame comprises an elongated platform extending laterally and substantially normal to the axial plane of said shaft, said worm extending substantially parallel to said platform, and said drive means comprising a motor mounted on said platform and drivingly connected to said worm.

4. The invention according to claim 3 further comprising torsion bar means connecting said platform to a stationary object.